United States Patent [19]
Liao

[11] 3,801,899
[45] Apr. 2, 1974

[54] MEANS FOR DETECTING THE INCEPTION OF CORONA DISCHARGES WITHIN INDUCTION APPARATUS

[75] Inventor: Tseng W. Liao, Media, Pa.

[73] Assignee: General Electric Company, Philadelphia, Pa.

[22] Filed: Mar. 26, 1973

[21] Appl. No.: 345,176

[52] U.S. Cl. .................................. 324/52, 324/54
[51] Int. Cl. ... G01r 31/08, G01r 31/12, G01r 31/06
[58] Field of Search .......... 324/52, 54, 72, 140, 55; 328/110

[56] References Cited
UNITED STATES PATENTS

| | | | |
|---|---|---|---|
| 2,315,450 | 3/1943 | Nyquist | 324/52 |
| 2,493,800 | 1/1950 | Biskeborn | 324/52 |
| 2,636,118 | 4/1953 | Smaller | 328/110 |
| 3,173,086 | 3/1965 | Kresge | 324/52 |
| 3,206,684 | 9/1965 | Der et al. | 328/110 |
| 3,346,809 | 10/1967 | Bader et al. | 324/54 |
| 3,370,227 | 2/1968 | Bader et al. | 324/54 |
| 3,374,428 | 3/1968 | Eager et al. | 324/54 |
| 3,430,137 | 2/1969 | Eager et al. | 324/54 |
| 3,555,413 | 1/1971 | Matsuba | 324/54 |
| 3,707,673 | 12/1972 | Carter | 324/52 |

*Primary Examiner*—Gerard R. Strecker
*Attorney, Agent, or Firm*—William Freedman; J. Wesley Haubner

[57] ABSTRACT

Corona-detecting means detects the inception of corona discharges within liquid-insulated induction apparatus connected in a power circuit. The corona-detecting means comprises: (a) corona-level detector means for developing a first signal pulse in response to the presence on the power circuit of corona-produced, radio-frequency voltage exceeding a predetermined amplitude, (b) a pressure wave detector for developing a second signal pulse in response to the development of ultrasonic pressure waves in said liquid exceeding a predetermined amplitude, and (c) a coincidence circuit for developing an output signal in response to receipt of both said first and second signal pulses during any one of predetermined monitoring periods, each having a duration less than about 360 degrees of power frequency voltage.

10 Claims, 3 Drawing Figures

MEANS FOR DETECTING THE INCEPTION OF CORONA DISCHARGES WITHIN INDUCTION APPARATUS

BACKGROUND

This invention relates to corona-detecting means for detecting the inception of corona discharges within induction apparatus, such as power transformers and reactors, that have their high voltage parts immersed within a liquid dielectric.

It is generally recognized that a major cause of failures in induction apparatus is corona discharges within the apparatus. If such corona discharges can be detected at an early enough stage, suitable corrective steps can be taken to prevent their continuation, thus preventing what could become a costly failure of the apparatus.

Various means are known for detecting corona on the power circuit in which the high voltage winding of the induction apparatus is connected. Typically, this is done by corona-detecting means sensitive to the radio-frequency electrical wave propagations produced by the corona discharges. While such radio-frequency propagations do indicate the presence of corona, they sometimes do not indicate as reliably as might be desired the location at which the corona is occurring, i.e., whether the corona discharges are occurring outside or inside the induction apparatus. Without reliable information as to the corona location, one does not know whether to shut down the induction apparatus and undertake repairs to prevent continued corona discharges. There is usually no reason to shut down and examine the apparatus, which is a costly undertaking, if the corona discharges are located outside the apparatus.

SUMMARY

Thus, a general object of my invention is to provide corona-detecting means which can reliably determine whether the corona discharges detected thereby are occurring at a location inside or a location outside the induction apparatus.

Another object is to provide corona-detection means capable of performing as in the preceding object and also capable of determining the frequency with which any corona discharges inside the induction apparatus are occurring. Unless the internal corona discharges are occurring at at least a predetermined minimum frequency, there is no reason for concern.

In carrying out my invention in one form, I provide corona-level detector means sensitive to the voltage on the power circuit for developing a first electrical signal pulse in response to the appearance of corona-produced, radio-frequency voltage exceeding a predetermined amplitude on said power circuit during any one of predetermined corona-level sampling periods. I also provide a pressure-wave detector comprising a transducer arranged to receive and sensitive to ultrasonic pressure waves in the liquid dielectric of the induction apparatus for developing a second electrical signal pulse in response to receipt of ultrasonic pressure waves exceeding a predetermined amplitude by said transducer during any one of predetermined pressure-wave sampling periods. The first and second signal pulses are supplied to a coincidence circuit which acts to develop a first-stage output signal in response to receipt of both said first and second signal pulses during any one of predetermined monitoring periods. Counting means counts said first-stage output signals and develops a second-stage output in response to the occurrence of a predetermined minimum number of said first-stage output signals over a predetermined period of time comprising a plurality of said monitoring periods.

BRIEF DESCRIPTION OF DRAWINGS

For a better understanding of the invention, reference may be had to the following description taken in conjunction with the accompanying drawings, wherein.

DETAILED DESCRIPTION OF PREFERRED EMBODIMENT

Figure 1:
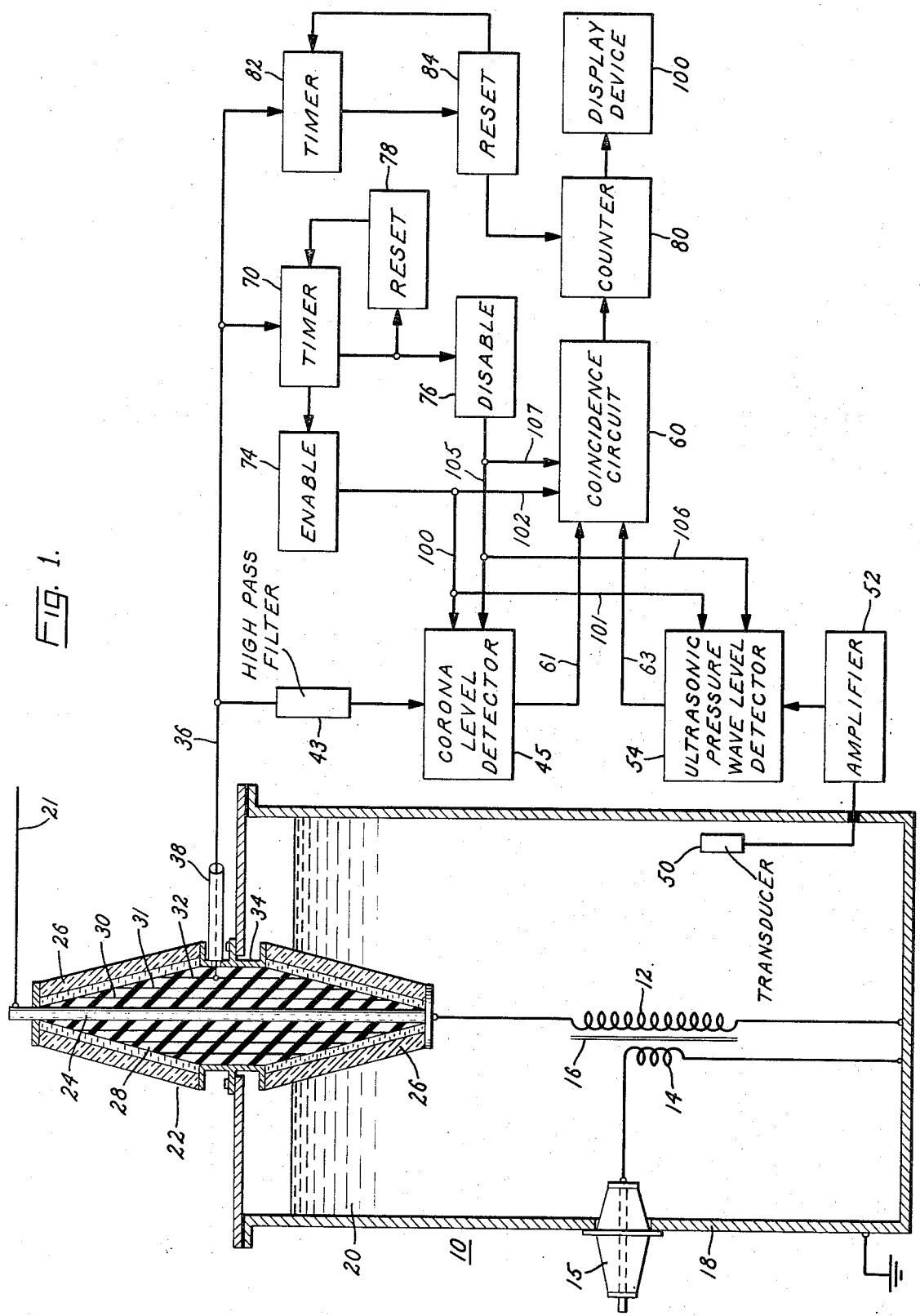
FIG. 1 is a schematic view of induction apparatus equipped with corona-detecting means embodying one form of my invention.

Referring now to FIG. 1, the induction apparatus schematically shown therein is a single phase power transformer 10 comprising a high voltage winding 12, a low voltage winding 14, and an iron core 16 through which the windings are inductively coupled in a conventional way. The transformer also comprises a grounded metal tank 18 in which the windings 12 and 14 are located and liquid dielectric 20, such as oil, within the tank in which the windings are immersed. In the illustrated embodiment, each of the windings 12 and 14 has its lower terminal connected to ground. The upper terminal of the low voltage winding 14 is connected to the conductor of a suitable low voltage terminal bushing 15.

For carrying current between an external phase conductor 21 and the high voltage winding 12, a high voltage terminal bushing 22 is provided. This terminal bushing 22 comprises a high voltage conductor 24 having its lower end electrically connected to the high voltage end of the high voltage winding 12 and its upper end connected to the external conductor 21. Surrounding the bushing conductor 24 is a porcelain shell 26 that supports the bushing conductor and electrically isolates it from the grounded tank 18. The bushing is a conventional condenser-type high voltage bushing which includes an insulating core 28 located within the porcelain shell and surrounding the conductor 24 and oil filling the space between the core 28 and the shell 26. Imbedded within and disposed in concentric spaced-apart relation within the core 28 are tubular, metallic voltage-grading shields 30, 31, 32, each of which defines a cylindrical surface along which appears a voltage that is a fixed percentage of the voltage between the high voltage conductor 24 and ground. Between the outer shield 32 and a tubular ground sleeve 34, which surrounds the core, two spaced-apart leads 36 and 38 are connected to provide a voltage between the leads proportional to the much greater voltage between the high voltage conductor 24 and ground. Lead 38 preferably is a tubular conductor surrounding the lead 36 and coaxially disposed relative to lead 36.

Figure 2:
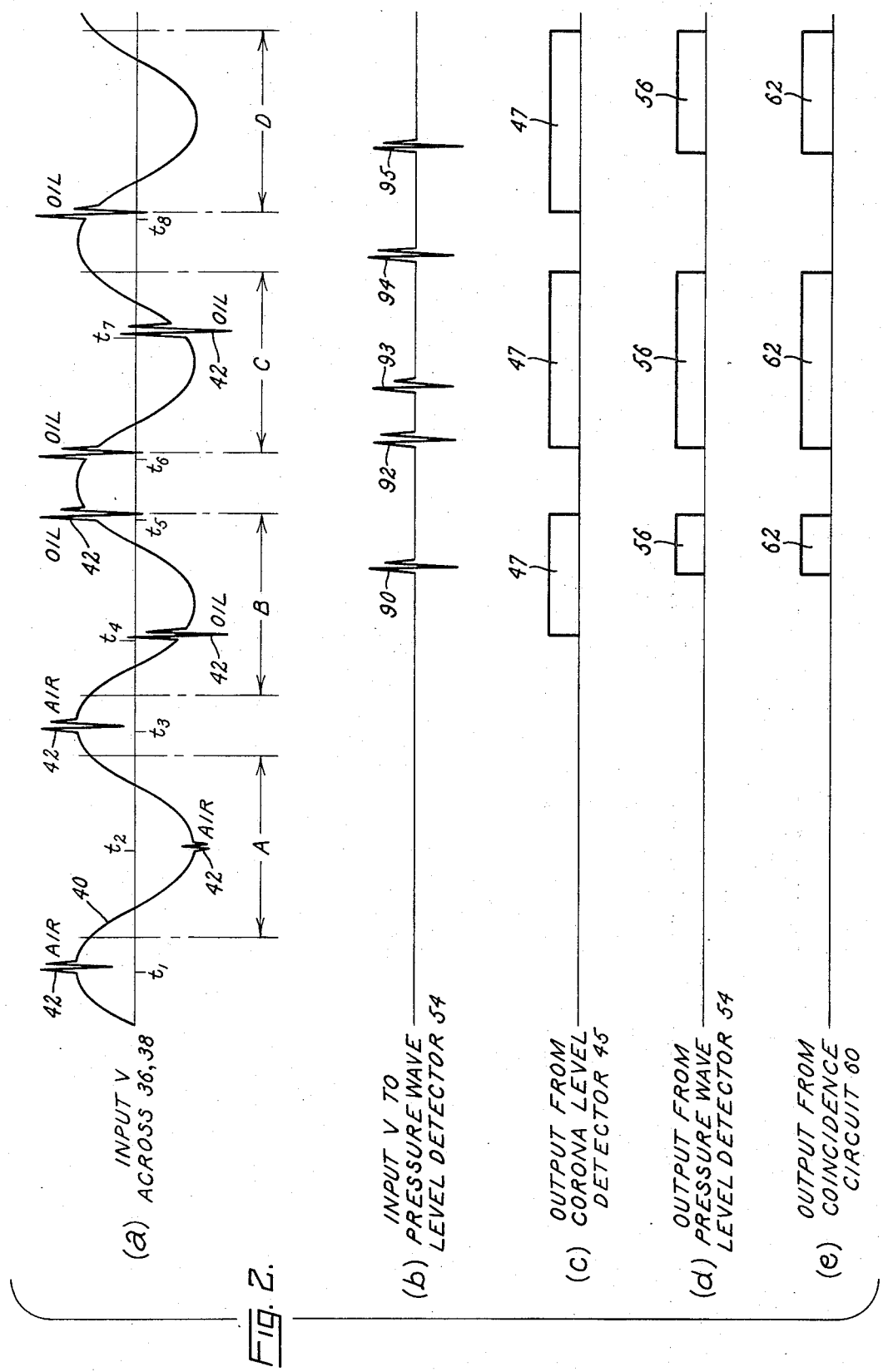
FIG. 2 is a graphic representation of certain electrical relationships present in my corona-detecting means.

If corona discharges occur on the high voltage power circuit phase that includes the conductors 21, 24, and the winding 12, these discharges produce radio-frequency electrical wave propagations that are superimposed on the normal voltage wave that appears between high voltage conductor 24 and ground. Between the leads 36 and 38, a small percentage of this total voltage appears with a wave form such as is illustrated in FIG. 2, where the normal voltage wave 40 has corona-produced, radio-frequency waves 42 superimposed thereon. This wave form is a replica of the voltage appearing between high voltage conductor 24 and ground and indicates that corona discharges are occurring at times $t_1$ through $t_8$.

For sensing this condition, I provide a corona-level detector 45 and a high pass filter 43, to which the output from across leads 36, 38 is supplied. Filter 43 allows only the high frequency components (42) to pass. These high frequency components are supplied to the level detector 45, which develops an output signal 47 (FIG. 2c) if: (1) the level detector 45 is then enabled and (2) the high frequency components have an amplitude (irrespective of polarity) exceeding a predetermined value. The output signal 47 from the level detector 45 continues as shown in FIG. 2c until the level detector 45 is disabled, as will soon be described. Each of the periods during which the level detector 45 is enabled is referred to herein as a corona-level sampling period. It is assumed for illustrative purposes in FIG. 2 that the level detector 45 is enabled only during the corona-level sampling periods designated A, B, C, and D and that the high frequency components occurring at $t_1$ and $t_3$ through $t_8$ are of sufficient amplitude to turn on the level detector 45 (when enabled) but that those occurring at $t_2$ are of insufficient amplitude to turn on the level detector.

To assist the corona detector in distinguishing between corona discharges occurring inside the induction apparatus 10 and those occurring outside the induction apparatus, I enable the corona-level detector 45 only during a portion of each one-cycle period of power frequency voltage. During the remaining portion of the cycle, and, specifically, during the period when the power frequency voltage is near its positive crest, the corona level detector 45 is disabled and therefore unresponsive to the high frequency components 42 appearing at this particular time. In the specific illustrated embodiment, the corona-level detector 45 is enabled at an instant 45° past the instant of positive crest voltage and is disabled at an instant 45° prior to the next positive voltage crest, as will be apparent from the locations of sampling periods A, B, C, and D in FIG. 2. Between immediately successive sampling periods, there is a 90° interval when the corona level detector 45 is disabled, or unresponsive to the voltage on the power circuit.

The reason for disabling the corona-level detector during the period adjacent positive crest voltage is that corona in air will produce strong high-frequency components on positive crests but only weak ones on negative crests. Since the corona-level detector 45 is disabled during the period adjacent positive crest voltage, the corona-level detector effectively ignores, or is unresponsive to, the high-frequency components during this period. Although the level detector 45 is enabled during the periods adjacent negative crest voltage, the high frequency components resulting from corona in air are usually of insufficient amplitude on negative crests to turn on the corona-level detector. Thus, the corona-level detector 45 will remain off in most cases where only corona in air is present. Since corona on the circuit 21, 42, 12 in locations outside the induction apparatus 10 will usually be corona in air, the corona-level detector usually will not respond to such externally-located corona discharges.

In certain unusual cases, as during certain rainstorm conditions, corona external to induction apparatus 10 can produce radio frequency components on negative as well as positive loops of voltage. One of my objectives is to distinguish such unusual cases from the case where the radio-frequency components are being produced by corona occurring within the liquid 20 of the induction apparatus 10.

Before explaining in detail how I make this distinction, the following is presented by way of background. It is known that corona discharges produce both audible and ultrasonic pressure waves in the medium surrounding the discharge. These pressure waves propagate radially outward in all directions and generally contain a wide range of frequency components. In gases, the high frequencies are attenuated, leaving only vibrations in the audible sound range. But in liquids and in some solids, the attenuation of high frequencies is not as severe, and the corona discharges will produce pressure variations rich in ultrasonic components as well as audible components.

For detecting the presence of such ultrasonic components, I provide a transducer 50 located within the dielectric liquid 20 adjacent the grounded wall of tank 18. This transducer 50 can be of any suitable conventional type, such as, for example, the type described in a paper by J. G. Anderson in the AIEE Transactions, Vol. 75, part III, (1956) pages 1193–1198. As such, it comprises a piezoelectric element covered on its outside by grounded conducting material acting as a shield against electrostatic-pickup interference. The piezoelectric element is preferably of lead titanium zirconium oxide instead of the barium titanate referred to in the Anderson paper. The transducer produces an output voltage generally proportional to the amplitude of the pressure wave received thereby. This output is amplified by a suitable high gain amplifier 52, preferably constructed in the general manner described in the aforesaid Anderson paper. The output from amplifier 52, which output is shown in FIG. 2b, is supplied to a level detector 54 (designated the ultrasonic pressure-wave level detector) which will immediately produce an output signal pulse 56 (FIG. 2d) if the amplitude of the signal (irrespective of polarity) received from amplifier 52 exceeds a predetermined level. This output signal 56 continues until the level detector 54 is disabled at the end of a pressure-wave sampling period, soon to be described in greater detail.

Another suitable device usable for the transducer 50 and amplifier 52 is the ultrasonic pressure wave sensor sold by Straza Industries of El Cajona, Calif., as its Type SP125CA Hydrophone/Pre-Amp (for oil environment).

The signal pulses 47 and 56 from the two level detectors 45 and 54, respectively, are supplied as inputs to a coincidence circuit 60 via channels 61 and 63. The coincidence circuit 60 develops an output signal 62 (FIG. 2e) if the two input signals 47 and 56 are received during a preselected sampling, or monitoring, period. In the illustrated form of the invention, each monitoring period has a duration of approximately 270° of the power frequency voltage, and these monitoring periods coincide with the corona-level sampling periods A, B, C, and D.

The details of the coincidence circuit are not shown since the circuit can be of any suitable conventional form. In a preferred embodiment, this coincidence circuit is a conventional AND-type logic circuit that delivers an output pulse (such as 62 in FIG. 2e) if input signals (such as 47 and 56) are simultaneously received on its two input channels while it is enabled. An example of this type circuit is disclosed on pages 397–398 of the book, Pulse and Digital Circuits, by Millman et al, McGraw-Hill Book Co. (1956).

For defining the starting point and the duration of the sampling periods for the level detectors 45 and 54 and the coincidence circuit 60, I provide a timer 70 which is suitably coupled to the power circuit 21, 24, 12, as through the bushing coupling device 32–38. This timer 70 starts a timing operation each time the power frequency voltage of the circuit 21, 24, 12 passes through its positive crest. 45° after the positive crest, the timer 70, delivers an input signal to an enabling circuit 74, which responds by immediately delivering an enabling signal to the corona-level detector 45 via channel 100, to the ultrasonic pressure level detector 54 via channel 101, and to the coincidence circuit 60 via channel 102, thus enabling these latter devices, and initiating a sampling period for each device. At the end of a period 315° after the positive crest, the timer 70 delivers a signal to a disabling device 76, which responds by delivering a disabling signal to the level detectors 45 and 54 and coincidence circuit 60 via channels 105, 106, and 107, thus disabling these latter devices and ending their sampling periods. During the 270° period between enablement and disablement, the devices 45, 54, and 60 are in an enabled condition. At the same time that the timer 70 delivers a signal to the disabling circuit 76, it also delivers a signal to a timer reset circuit 78 (FIG. 1), which responds by resetting the timer 70 to its normal at-rest condition in preparation for another timing operation.

The sampling period for the corona-level detecting means 45, 43, 36, 38 is referred to herein as the corona-level sampling period; the sampling period for the pressure wave detector 50, 52, 54 is referred to herein as the pressure-wave sampling period; and the sampling period for the coincidence circuit 60 is referred to herein as its monitoring period. The term "resetting operation", as applied to any one of the three devices 45, 54, or 60, denotes the combination of a disabling operation and an immediately-succeeding enabling operation.

The operation of my corona-detecting means will be described in more detail with reference to the graph of FIG. 2. It will be seen that no output pulse 62 (FIG. 2e) resulted from the events occurring during sampling period A. The corona occurring at time $t_2$ was of insufficient amplitude to turn on corona level detector 45, and transducer 50 delivered no output for turning on the ultrasonic pressure wave level detector 54. This absence of response during period A is appropriate because all that occurred during this period was corona in air, which produced the weak r.f. components 42 at negative crest. While corona in air typically produces strong r.f. components at positive crest, e.g., at times $t_1$ and $t_3$, such corona, being outside the induction apparatus 10, will not produce pressure waves in the liquid dielectric 20. Thus, the transducer 50 produced no significant output in response to such air corona, as indicated by FIGS. 2b and 2d, during sampling period A.

During sampling period B of FIG. 2, an output pulse 62 was developed, as shown in FIG. 2e. This was an appropriate response inasmuch as corona in oil occurred at instant $t_4$ and ultrasonic pressure waves resulting therefrom were received by transducer 50 (as indicated in FIG. 2b at 90 about 90° later).

During the sampling period C another output pulse 62 was developed: (1) because the corona in oil occurring at $t_5$ produced a pressure wave (corresponding to 92 in FIG. 2b) that produced turn-on of corona level detector 54 when the level detector was enabled at the start of sampling period C and (2) because the corona in oil starting at $t_6$ caused a turn-on of corona level detector 45 as soon as it was enabled shortly after time $t_6$.

The corona in oil occurring at $t_7$ caused a pressure wave (corresponding to 94 in FIG. 2b) to be received by transducer 50 but since this receipt was between sampling periods C and D, the transducer 50 produced no response by ultrasonic pressure wave level detector 54.

At instant $t_8$, corona in oil again occurred, turning on level detector 45 (as shown at 47) and producing an ultrasonic pressure wave that caused transducer 50 to produce a signal 95 and a turn-on of level detector 54 (as shown at 56) upon receipt of the pressure wave. The simultaneous receipt of signals 47 and 56 causes coincidence circuit 60 to develop another output pulse 62.

For counting the output pulses from the coincidence circuit 60, a counter 80 (FIG. 1) is provided. This counter performs a counting operation during preselected counting intervals, the duration of each interval being determined by a timer 82 also shown energized from the bushing coupling device 32–38. In one form of the invention, the timer 82 is set to provide counting intervals, each several seconds in duration (e.g., 5 seconds). At the end of such a 5 second interval, the timer 82 delivers an output signal to a reset device 84, which operates to restore the counter 80 and the timer 82 to their original at-rest condition. If the counter counts more than a predetermined number of output pulses 62 during the five second counting interval, it activates a display device 100, e.g., an alarm or warning light, which provides notification that significant corona discharges are occurring within the induction apparatus. The counter 80 can be of a conventional design, e.g., the storage counter disclosed on pages 346–348 of the book Pulse and Digital Circuits by Millman et al referred to hereinabove.

DISCUSSION

By relying upon a pressure wave detector that can distinguish ultrasonic vibrations from audible vibrations, I can materially reduce the chance of erroneous operation by the corona detector. In this regard, it should be noted that, as a general rule, the pressure waves produced by corona discharges external to the tank 18 can reach the transducer 50 only through the air surrounding the induction apparatus 10. Since the higher frequency components in such pressure waves are severely attenuated in passing through a gas, only those components in the audible sound range reach the transducer. The transducer is relatively insensitive to such audible components and thus produces no significant output in response thereto. Accordingly, such audible vibrations normally will not cause turn-on of the level detector 54 and resultant operation of the coincidence circuit 60.

Some rare types of external mechanical vibrations can result in ultrasonic pressure waves being transmitted to the transducer 50. But such pressure waves will normally not cause the system to give an erroneous indication of corona because the coincidence circuit 60 will deliver an output pulse only if it receives an indication of the presence of corona through the corona level detector 45 during the same sampling periods as the above described pressure waves are being received by the transducer 50.

It sometimes happens that the location of the power circuit 21 is such tht radio frequency signals from a radio transmitter might appear thereon. These signals are typically of a continuous nature, and interference therefrom can best be avoided by providing in series with high pass filter 43 another filter appropriately tuned to effectively prevent the entry of these signals into the corona detecting means.

Figure 3:
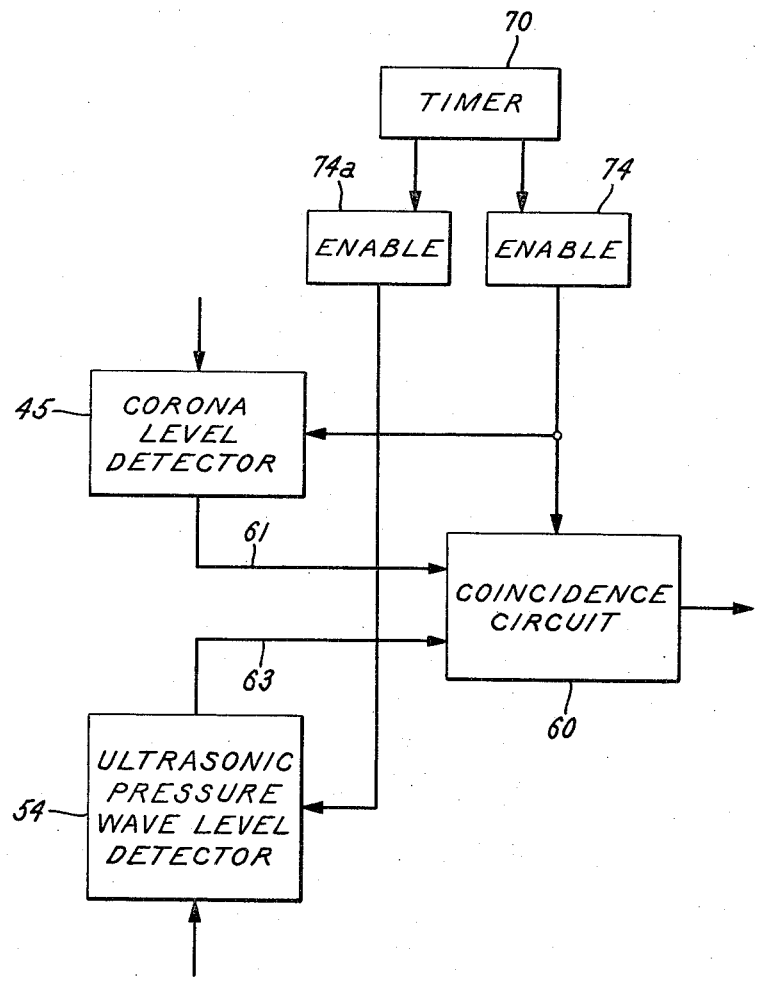
FIG. 3 illustrates a modified form of corona-detecting means.

While in the above described embodiment I have provided the ultrasonic pressure-wave level detector 54 and the corona level detector 45 with sampling periods that are coextensive, it is to be understood that such coextensiveness is not essential. As one alternative, I can provide the ultrasonic pressure-wave level detector 54 with a longer sampling period than the corona level detector 45 by starting the sampling period for the pressure-wave level detector closer to the immediately-preceding positive voltage crest. Since the level detector 54 is responding merely to pressure waves, its operation during this added interval is not affected by any air corona that might be occurring near such positive voltage crest. As is illustrated in FIG. 3, one way of obtaining this longer sampling period for the ultrasonic pressure wave level detector 54 is simply to provide a separate enabling device 74a for the ultrasonic pressure wave level detector 54. As determined by timer 70, the enabling device 74a enables the pressure-wave level detector 54 at instants preceding the start of the sampling periods depicted in FIG. 2. The other enabling device 74 of FIG. 3 enables the corona level detector 45 and the coincidence circuit 60 at the same times as the sampling periods A, B, C, and D begin in FIG. 2. A disabling device (not shown in FIG. 3 but corresponding to 76 in FIG. 1) ends the sampling periods of the three devices 45, 54, and 60 at the same instant, just as in the embodiment of FIG. 1.

As another alternative, I can reduce the sampling period of the corona level detector 45 by making this sampling period coincide with the 180° interval during which the power frequency voltage 40 is negative.

It might be noted that although my preferred embodiment of FIGS. 1 and 2 excludes the interval around positive crest voltage from each sampling period, in some cases this degree of refinement is not necessary. In such cases, the ultrasonic pressure-wave sensor 50, 52, 54, in conjunction with the corona level detector 45, provides sufficient information to permit the corona detector to discriminate between corona in air and that in oil.

Although I have disclosed an embodiment in which the corona level detector 45 derives its input signal through a condensor bushing tap 32, 34, it is to be understood that my invention in its broader aspects comprehends the use of other electrical wave sensing devices for deriving this input signal, such as, for example, a suitable antenna located within the tank 18.

While I have shown and described particular embodiments of my invention, it will be obvious to those skilled in the art that various changes and modifications may be made without departing from my invention in its broader aspects; and I, therefore, intend in the appended claims to cover all such changes and modifications as fall within the true spirit and scope of my invention.

I claim:

1. Corona-detecting means for detecting the inception of corona discharges within single phase induction apparatus that comprises a tank containing a liquid dielectric, a high voltage winding within the tank immersed in said liquid, and a high voltage bushing comprising a conductor extending into the tank for carrying current to and from said winding, said corona-detecting means comprising:
   a. corona-level detector means sensitive to the voltage on the power circuit phase in which said conductor and winding are connected for developing a first electrical signal pulse in response to the appearance of corona-produced, radio-frequency voltage exceeding a predetermined amplitude on said power circuit phase during any one of predetermined corona-level sampling periods,
   b. a pressure-wave detector comprising a transducer arranged to receive and sensitive to ultrasonic pressure waves in said liquid dielectric for developing a second electrical signal pulse in response to the receipt of ultrasonic pressure waves exceeding a predetermined amplitude by said transducer during any one of predetermined pressure-wave sampling periods,
   c. a coincidence circuit to which said first and second signal pulses are supplied for developing a first-stage output signal in response to receipt of both said first and second signal pulses during any one of predetermined monitoring periods,
   d. and counting means for developing a second-stage output in response to the occurrence of a predetermined minimum number of said first-stage output signals over a predetermined period of time comprising a plurality of said monitoring periods.

2. The corona detecting means of claim 1 in which said corona-level detector means develops said first signal pulse only in response to the appearance on said phase of radio-frequency voltage exceeding a predetermined amplitude during a negative loop of power frequency voltage on said phase.

3. The corona detecting means of claim 1 in which each of said sampling and monitoring periods has a duration of about 360° or less of power frequency voltage on said phase.

4. The corona detecting means of claim 3 in which: said corona-level detector means, when enabled, is responsive to the voltage on said power circuit phase for only a portion of each one-cycle period of said power frequency voltage, said portion excluding that interval of the one-cycle period during which the positive loop of said power frequency voltage is near its crest.

5. The corona detecting means of claim 3 in which: said corona-level detector means is unresponsive to the voltage on said power circuit phase during that interval of each one-cycle period of said power frequency voltage when the positive loop of said power frequency voltage is near its crest.

6. The corona detecting means of claim 5 in which said pressure-wave detector is responsive to said ultrasonic pressure waves during the same portion of each one-cycle period as the corona level detector is responsive to the voltage on said power circuit phase.

7. The corona detecting means of claim 5 in which said pressure-wave detector is responsive to said ultrasonic pressure waves during a portion of each one-cycle period which includes at least some of the time when said corona level detector means is unresponsive to voltage on said power circuit phase.

8. The corona detecting means of claim 1 in which said corona-level detector means is capacitively coupled to said bushing conductor.

9. The corona detecting means of claim 1 in which: said corona level detector means is reset after each of said corona-level sampling periods, said pressure wave detector is reset after each of said pressure-wave sampling periods, and said coincidence circuit is reset after each of said monitoring periods, thus enabling a new first-stage output signal to be developed during each monitoring period if corona discharge is then occurring within said liquid dielectric.

10. The corona detecting means of claim 9 in which each of said sampling and monitoring periods has a duration of about 360° or less of power frequency voltage on said phase.

* * * * *